March 17, 1942.                K. JURSCHICK                2,276,312
                          LANDING HOOK FOR AIRCRAFT
                             Filed Oct. 11, 1938
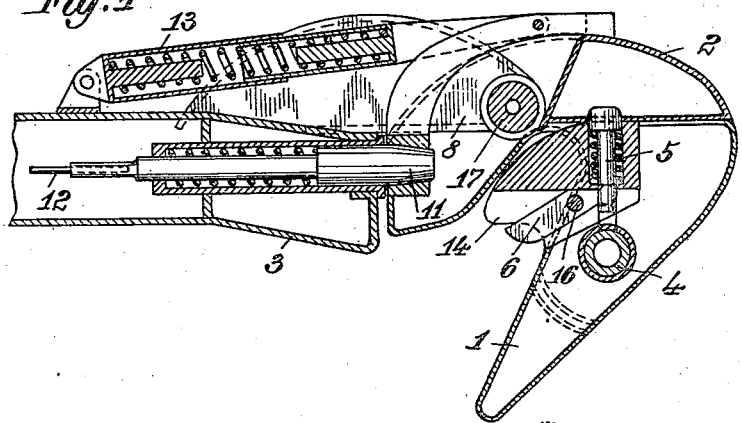
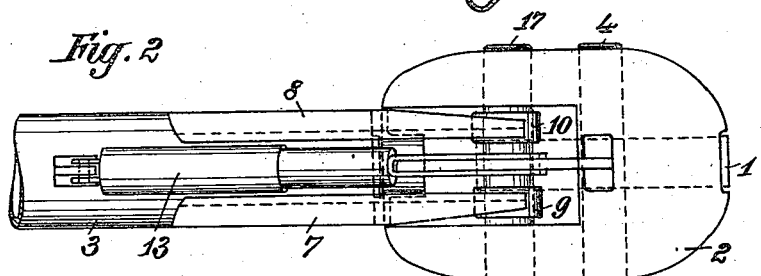
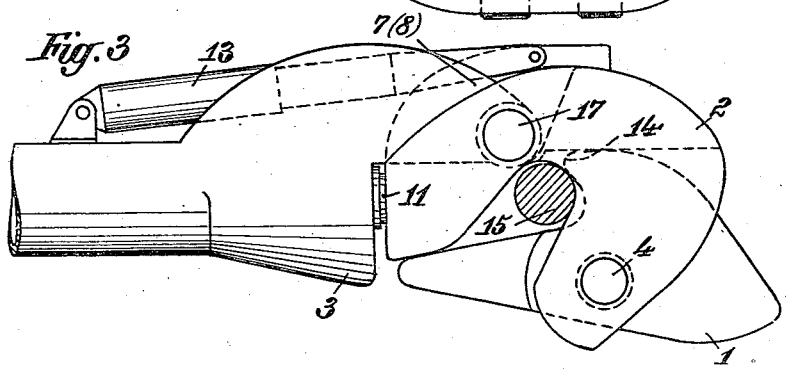
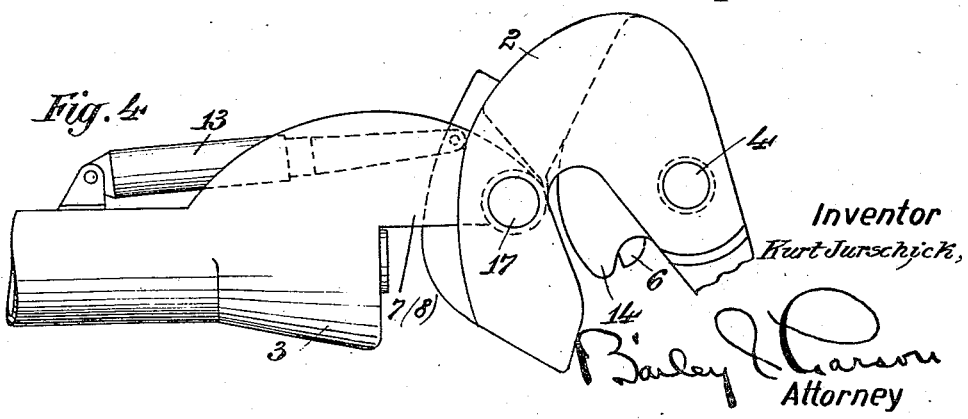
Inventor
Kurt Jurschick,
Attorney Patented Mar. 17, 1942

2,276,312

UNITED STATES PATENT OFFICE 2,276,312

LANDING HOOK FOR AIRCRAFT

Kurt Jurschick, Brandenburg, Havel, Germany, assignor to Arado Flugzeugwerke Gesellschaft mit beschrankter Haftung, Brandenburg, Havel, Germany Application October 11, 1938, Serial No. 234,450
In Germany October 13, 1937

5 Claims. (Cl. 244—110)

The invention relates to a landing hook for aircraft which on landing of the aircraft at the landing ground engages in a catching rope stretched transversely of the direction of flight.

For aircraft intended to land on small surfaces for example on the decks of aircraft carrying ships, hooks have already been used which are secured to a tube, rope or the like, lowered from the aircraft. These hooks when the aircraft lands engage in successive ropes arranged over the landing surface transversely of the direction of flight, and as soon as the hook has engaged the ropes the latter yield somewhat and act as a brake on the aircraft.

The subject of the present invention is a hook which is so formed that it engages only a single catching rope or cable, but slides over the others. As a result a uniform braking action is applied to the aircraft. The hook of the invention affording these advantages consists of three main bodies of which two are so formed that the two bodies are locked together in the open ready-for-use position on the hook and are also locked in relation to the third, on contacting with the catching rope or cable close about the same and by the action thereof remain closed until the lock between the second and third bodies is released whereupon on further action of the rope or cable the three bodies pass into an open position releasing the rope or cable.

Further features of the invention will appear from the following description of the embodiment illustrated by way of example in the accompanying drawing.

In the drawing

Fig. 1 is a longitudinal section through the landing hook in ready-for-use position.

Fig. 2 is a plan view.

Fig. 3 is a side elevation of the landing hook in closed position.

Fig. 4 shows the landing hook also in side elevation but again in open position.

In all of the figures of the drawing the three main bodies of which the landing hook consists are indicated by the numerals 1, 2 and 3.

The body 1 is rotatably secured to the body 2 by means of the pivot 4. In the ready-for-use position of the landing hook the bodies 1 and 2, as is clear from Fig. 1, are locked together by means of a spring controlled pin 5, so that they cannot rotate relatively to one another. The lock can be released by suitable operation of a releasing lever 6. The lever 6 can be turned about a pivot 16 and act on the locking pin 5.

The body 3 is connected with two arms 7, 8 (Fig. 2), the free ends of which each provide a bearing 9, 10. The bearings 9, 10 receive a spindle 17 which can rotate in the said bearings and on which the body 2 is mounted.

In the ready-for-use position (Fig. 1) and in the closed position (Fig. 3) of the landing hook the body 2 is locked against rotation with respect to the body 3 by means of a locking pin 11. The locking pin 11 is under the action of a spring 11' arranged in a spring housing. On the extension of the locking pin 11 projecting from the spring housing is secured a rope 12 or the like. When the rope 12 is pulled the lock is released.

The bodies 2 and 3 are moreover coupled with one another by a resiliently formed member 13. This member serves to return the body 2 from the open position (Fig. 4) into the ready-for-use position (Fig. 1).

The modus operandi of the landing hook is as follows:

When the aircraft approaches the landing surface, the pilot by suitable known auxiliary means lowers from the tail of the aircraft a tube, rope or the like on which the landing hook is mounted. The lowered landing hook when the aircraft approaches the landing point engages a braking rope or cable stretched across the landing surface transversely of the direction of flight. The landing hook in the ready-for-use position (Fig. 1) grips this rope or cable which passes into the jaw-like opening formed by the bodies 1 and 2. On entering the said jaw-like opening the rope or cable first strikes the releasing lever 6 which is turned about the pivot 16 in the clockwise direction in Fig. 1. By this turning movement of the lever 6 the pin 5 is pulled down and the lock between the bodies 1 and 2 released.

The rope or cable 15 now strikes a nose 14 connected with the body 1 and turns the body 1 in clockwise direction about the pivot 4. The landing hook is thereby closed (Fig. 3). The closing of the hook ensures that the aircraft will pass over the other braking ropes or cables stretched across the landing surface.

If after the aircraft has landed the hook is to be released from the braking rope or cable 15 gripped by it the rope 12 secured to the locking pin 11 is pulled by a member of the crew of the aircraft by known auxiliary means, not shown. The lock between the bodies 2 and 3 is thereby released. Under the action of the braking rope or cable 15 the bodies 1 and 2 are now turned about the spindle 17. At the same time the body 1 turning about the pivot 4 in counter-clockwise direction passes into the open position shown in Fig. 4. The braking rope or cable now falls out of the jaw-like opening in the landing hook formed by the bodies 1 and 2. At the same time the releasing lever 6 is released, the pin 5 is pushed forwards under the action of the spring controlling it and the bodies 1 and 2 are locked together against rotation. Under the action of the spring member 13 the bodies 1 and 2 are turned about the spindle 17 into the ready-for-use position shown in figure and are again locked by the locking pin 11 against rotation about the said spindle.

I claim:

1. An aircraft landing hook for engaging a braking cable extending across a landing station, said landing hook comprising three principal members, locking means for holding two of said members together to provide an opening to receive the braking cable, locking means for locking said members relative to the third member, means operable by the braking cable on entering the opening to release the first mentioned locking means, means to cause the two members to close around the braking cable and to remain closed, said last mentioned means including a nose on one of the principal members projecting in the operative position of the hook into the opening thereof and adapted to be turned about another main member, means for releasing the second mentioned locking means and means thereafter operable by the braking cable to move the three members into an open position to release the braking cable.

2. An aircraft landing hook for releasably engaging a braking cable extending across a landing station, including a support member, a first jaw member movably supported on said support member for movement between cable engaging and cable releasing positions relative thereto, a second jaw member movably supported on said first jaw member for movement therewith and for movement between open and closed positions relative to said first jaw member, releasable means for releasably holding the first jaw member in said cable engaging position, surface means on said second jaw member engageable with a landing cable when said first and second jaw members are in said cable engaging and said open positions, respectively, for moving said second jaw member to said closed position whereby to close the mouth between said jaws and to hold said cable, and means for releasing said releasable means whereby to permit said first jaw member to be swung to said cable releasing position to release said cable.

3. An aircraft landing hook as claimed in claim 2, and means on said second jaw member operably engageable with said cable only after said first jaw member has moved from said cable engaging position to said cable releasing position for returning said second jaw member to said open position by movement of said cable from said first jaw member.

4. In an aircraft landing hook as claimed in claim 2, detent means releasably holding said second jaw member in said open position relative to said first jaw member, and trigger means extending between said jaws forward of said surface means for engagement with said cable for releasing said detent means.

5. An aircraft landing hook as claimed in claim 2, and resilient means engaged between said support member and said first jaw member for yieldably holding said first jaw member in operative position.

KURT JURSCHICK.